Jan. 9, 1968 H. GEISSLER 3,363,180

COMMUNICATION SYSTEM

Filed Sept. 21, 1964 4 Sheets-Sheet 1

INVENTOR
Helmut Geissler

BY Spencer & Kaye
ATTORNEYS

INVENTOR
Helmut Geissler

BY Spencer & Kaye
ATTORNEYS

INVENTOR
Helmut Geissler

BY Spencer & Kaye
ATTORNEYS

Inventor:
HELMUT GEISSLER
By Spencer & Kaye
Attorneys

United States Patent Office 3,363,180
Patented Jan. 9, 1968

3,363,180

COMMUNICATION SYSTEM

Helmut Geissler, Backnang, Germany, assignor to Telefunken Patentverwertungsgesellschaft m.b.H., Ulm (Danube), Germany Filed Sept. 21, 1964, Ser. No. 398,002
Claims priority, application Germany, Sept. 21, 1963, T 24,762
7 Claims. (Cl. 325—4)

The present invention relates to the regulating of the frequency in a communication system using satellites, preferably subsynchronously orbiting satellites, in which the frequency channels assigned to each ground or earth station are, in accordance with the recommendations of the CCITT (Comité Consuiatif International de Télégraphie et de Téléphonie), combined into carrier frequency groups and are transmitted, together with respective group pilot frequency, as single-side-band amplitude modulation. The satellite station receives the carrier frequency groups of all earth stations and, after suitably converting these groups, transmits them as a broad-band signal which is preferably frequency modulated.

All satellite communication systems are sought to be so designed that all earth stations forming part of the system have free access to the satellite station, so as to obtain as complete a communication system as possible. To this end, the communication channel beam (one or more carrier frequency groups or supergroups) pertaining to a given earth station is sent out by the transmitter of this earth station at a high frequency. All earth stations are equipped with selection-type receivers, responsive to the other channels, which respond when a given recognition character is received, but only the particular station being called will pass on the call on the channel being operated. Here it is essential that the receivers of all of the earth stations be equipped with sufficient carrier frequency devices to enable each station to receive calls from the other earth stations. If all stations are to be able to receive all of the communication channels, all of the carrier frequency channels have to be demodulated down to the low frequency and have to be provided with selector-type receivers. In the case of heavy traffic between two earth stations, one or more carrier frequency groups can be switched through directly.

The invention will not be explained with reference to the accompanying drawings, in which.

Figure 1:
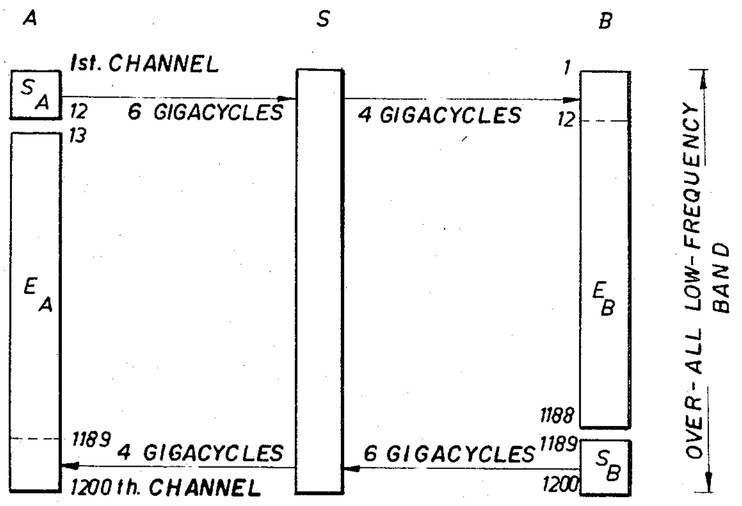
FIGURE 1 shows the frequency distribution of voice channels assigned to earth stations.

FIGURE 1 shows the frequency distribution of the voice channels assigned to the earth stations. Here, two earth stations A and B are shown which are to communicate with each other, over a voice channel, via the satellite relay station S. The entire carrier frequency band is, in the illustrated example, divided into 1200 channels. Earth station A has channels 1 through 12 assigned to it. The earth station A has a transmitter $S_A$ which puts out a high frequency signal containing the intelligence over one of the assigned voice channels. The frequency range for this is 6 gigacycles. The satellite station receives this signal and re-transmits the same, together with all of the other carrier frequency groups transmitted from all of the other earth stations, as a broad-band signal. This broad-band signal, which is transmitted in the frequency range of 4 gigacycles, is preferably frequency modulated. The earth station B, which is the station that is to establish voice contact with station A, receives this re-transmitted broad-band signal and, with the help of its receiver $E_B$, screens out the signal sent out from station A via the channel in question. In order that the station B may also communicate with station A, a second communication link is established, via the satellite station, over a given channel, between a transmitter $S_B$ at station B and a receiver $E_A$ at station A, the latter receiver likewise being a selector-type receiver. The communication between the two earth stations is thus established via two channels of different carrier frequencies.

Figure 2:
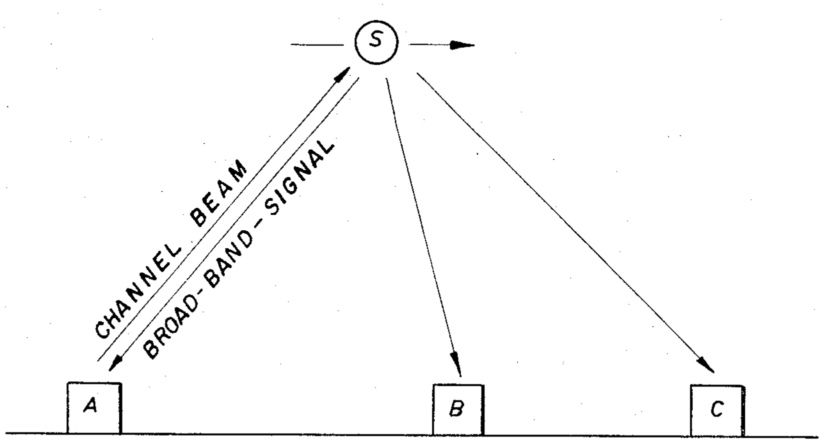
FIGURE 2 shows how individual earth stations are connected with a satellite relay station.

FIGURE 2 shows how individual earth stations A, B, C . . . are connected with the satellite relay station S. The earth station A sends out its channel beam as a high-frequency single-side-band amplitude modulated signal to the satellite S. This channel beam is re-transmitted from the satellite, together with channel beams of other earth stations forming part of the communication system, preferably as a frequency modulated broad-band signal. This broad-band signal is received by all of the earth stations, at each of which the desired channel is suitably screened out by the receiver of the earth station.

One of the items which is of importance insofar as the carrier frequency in single-side-band amplitude modulation is concerned is that the original frequency be generated, at the receiving station, with a maximum frequency deviation of 2 cycles per second; this, in accordance with the recommendations of the CCITT.

The following frequency shifts will occur in a satellite communication system of the type described above:

(1) The frequency deviation of the high-frequency transmitter carrier of the earth station.

(2) The frequency deviation of the high-frequency receiver carrier of the satellite station.

(3) The frequency deviation which is due to the Doppler effect during the transmission time from the earth station to the satellite and during the transmission time from the satellite to the earth station.

(4) Aside from the differential Doppler shift according to (3), the system will not inherently produce any internal shift of the basic carrier frequency band if the intelligence is transmitted from the satellite to the earth station by using broad-band frequency modulation.

If it is assumed that the transmission from A to S, and from B to S, takes place in the 6 gigacycle band, the accuracy of the frequency of the nominal high-frequency transmitter carrier of an earth station and the nominal high-frequency receiver carrier of the satellite is approximately $10^{-6}$, i.e., one part in a million. This means that the frequency deviation is, in each case, about 6 kilocycles. Due to the Doppler shift of a subsynchronously orbiting satellite, which in the case of an equatorial orbit can be up to $3\times10^{-6}$ and in the case of a polar orbit can be up to $5\times10^{-6}$, the center frequency is shifted an additional 30 kilocycles, so that a frequency deviation, converted into the low-frequency base band position, may be up to 42 kilocycles.

Figure 3:
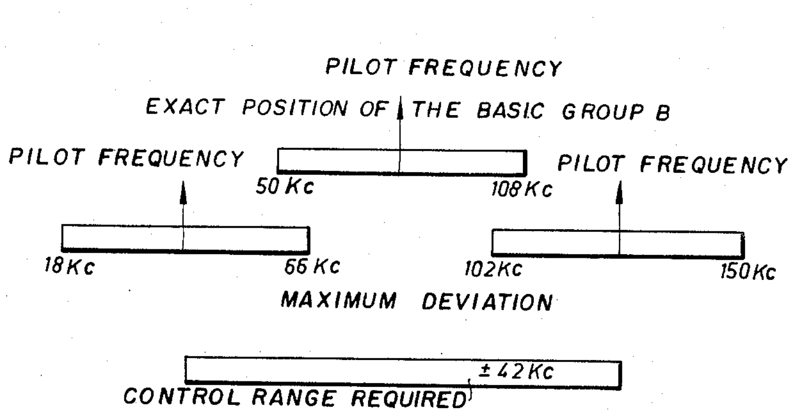
FIGURE 3 is a schematic illustration of the possible frequency shifts encountered in a satellite communication system.

FIGURE 3 is a schematic illustration of the possible frequency shifts. Starting from the exact position of the basic group B, which lies between 60 and 108 kilocycles, the maximum deviation is shown below. As explained above, the maximum possible frequency shifts of this basic group can thus be in the frequency range of 18 to 66 or 102 to 150 kilocycles. From this it will be seen that the maximum frequency shifts can be so large that the transmitter frequency bands overlap each other.

It is, therefore, the primary object of the present invention to provide a way in which the above-described frequency deviations are avoided.

Accordingly, the present invention concerns itself with a frequency regulating system for use in a communication system of the above-described type, i.e., a system operating in conjunction with a relay satellite, preferably a subsynchronously orbiting satellite, in which the frequency channels assigned to each earth station are combined into carrier frequency groups and are transmitted together with the group pilot frequency as a single-side-band amplitude modulated signal, while the satellite station receives the carrier frequency groups of all of the earth stations and, after suitable conversion, re-transmit the same as a broad-band signal, which is preferably frequency modulated. According to the present invention, each earth station, after having picked up the satellite signal, forms a regulating loop with the help of pilot frequency which the earth station itself sends out and which is again picked up in the broad-band signal of the satellite transmitter, for the purpose of automatically compensating such frequency deviations as arise between the satellite and the earth station, by suitably influencing the nominal high-frequency transmitter carrier, or a suitable subcarrier which is adapted to the requisite regulating limit, in this transmitting earth station.

If it is assumed that the satellite communication system uses the usual carrier frequency group arrangement and if, depending on the traffic requirements of the individual earth stations, one or more groups are assigned to the earth stations, the group of twelve suggests itself as a unit for each earth station. The basic group of 60 to 108 kilocycles will thus be used as the starting point for the frequency regulation according to the present invention. As the frequency standard for the frequency comparison to be carried out, one may, for example, select the group pilot frequency of 84.08 kilocycles which appears, converted, and which is available in each group of the entire frequency band. The nominal high-frequency transmitter carrier, or a suitable sub-carrier which is adapted to the requisite regulating limit, is regulated by means of a control loop between the earth station and the satellite station. This loop is shown in FIGURE 2, where it is constituted by the channel beam *a* sent out from earth station A and by the broad-band signal sent out from the satellite back to the earth station. Assuming that this earth station receives the basic group of 60 to 108 kilocycles, the group pilot frequency is transmitted as a high frequency with single-side-band modulation. For purposes of converting to this frequency, a number of intermediate conversions, using suitable sub-carriers, can be resorted to. The high frequency will now have undergone the frequency shift $\Delta_A$. Added to this is the Doppler shift $D_{SA}$ as a result of the movement of the satellite. Also added, during the time the signal is converted to the basic low-frequency band in the satellite, is the frequency shift $\Delta_S$ due to the inconstancy of the nominal high-frequency carrier of the satellite receiver. The satellite receiver sends out the entire basic low-frequency band and with it also the group in question of the above-mentioned earth station, as a frequency-modulated broad-band signal. This signal is received in the same ground station and is available as the carrier frequency band in the basic low-frequency system. The group pilot frequency under consideration is burdened with the above-mentioned frequency shifts and can be in the range of between 42 and 126 kilocycles. The group pilot frequency is received by a suitable pilot receiver. The amount by which the frequency is then to be regulated is obtained by comparing with the transmitted pilot frequency, which amount then acts on the high-frequency transmitter carrier of the transmitting earth station for correcting the error. Here, it may, under extremely unfavorable conditions, happen that difficulties will be encountered during the initial phase of the regulation. This will be the case when, in the event of maximum frequency deviation, the pilot frequencies of the neighboring groups appear to interfere, so that the regulation acts in response to the closest but undesired pilot frequency. Depending on the conditions (position of the earth station with respect to the orbit of the satellite, the type of modulation used), the pick-up from the satellite can be expected to involve either a positive or a negative frequency deviation. Inasmuch as these conditions can be determined by measuring in a manner compatible with the system, the filters of the pilot frequency receiver can be designed accordingly. It is thus possible, for instance, to equip the receiver with a broad-band filter whose pass characteristic is nonsymmetrical, depending on whether a positive or negative deviation is to be expected, such as to avoid the above-mentioned undesired adjustment. If the expected frequency deviation is no greater than ±20 kilocycles, a suitably designed symmetrical broad-band filter will suffice. After the adjustment, the automatically regulating narrow band stage of the pilot frequency receiver becomes effective, so that the high-frequency carrier is regulated to a residual error of about 10 cycles per second.

In the case of a 1200 channel system with 6 megacycles band width, the differential Doppler shift, with reference to the center frequency of 3 megacycles, is about 20 cycles at the cutoff frequencies. This frequency shift is particularly troublesome in the receiving section of the system. By taking the above-mentioned differential Doppler shift into consideration, the regulating effected in accordance with the present invention—this being a coarse regulation—makes possible a compensation of the possible frequency deviations to within about 30 cycles per second. In this case, neighboring voice channels can not possible be interfered with.

According to a further feature of the present invention, before a voice communication from one earth station is switched through to another earth station, the pilot frequency sent out by the first earth station (the transmitting station) which is received by the second earth station (the receiving station) in the broad-band signal of the satellite station, is compared with a frequency standard available in the second station for deriving a regulating criterion, by means of which the frequency shift of the carrier frequency receiver band is compensated. By using both the coarse and fine regulating, the original low-frequency band may be reproduced on the receiver side with a tolerance of maximally 2 cycles.

Figure 4:
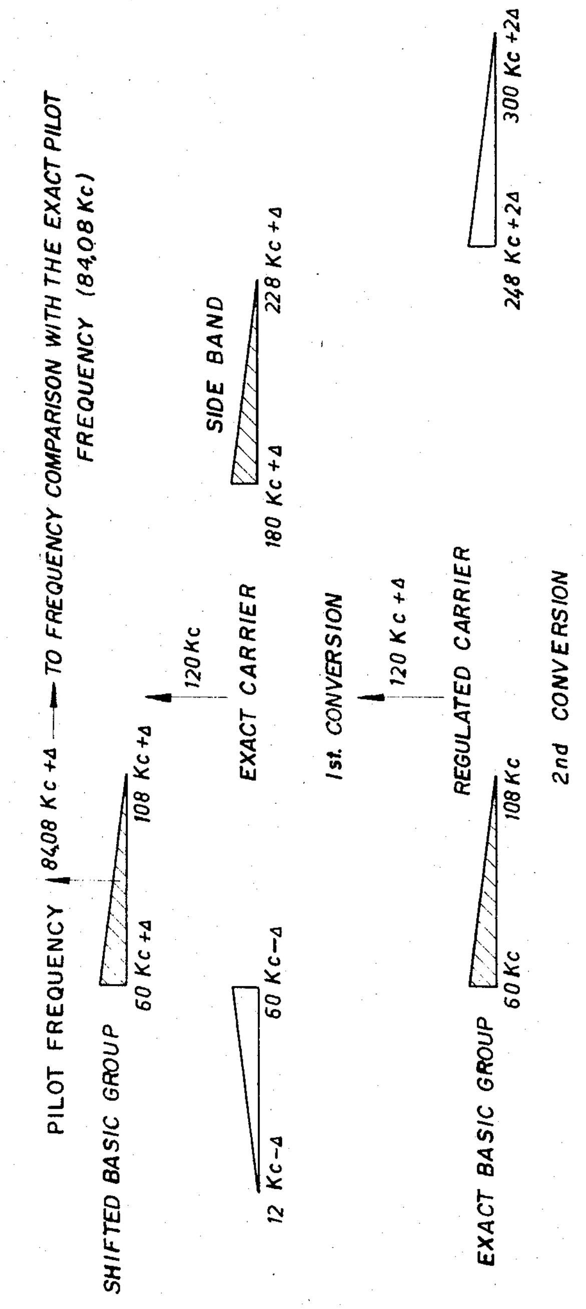
FIGURE 4 shows how a fine regulation is achieved.

The fine regulation is preferably effected by carrying out two carrier frequency conversions in the receiving station in order to shift the basic group into its exact position. This will be explained in conjunction with FIGURE 4. The shifted basic group lies, for example, between the frequencies 60 kilocycles $+\Delta$ and 108 kilocycles $+\Delta$, $\Delta$ representing the undesired frequency shift. The group pilot frequency is to have a frequency of 84.08 kilocycles $+\Delta$. This pilot frequency serves to derive the control criterion and, to this end, is compared with the exact pilot frequency of 84.08 kilocycles available in the station. The received and shifted basic group is brought, by means of the carrier of 120 kilocycles present in the carrier source of this earth station, into the frequency position of from 180 kilocycles $+\Delta$ to 228 kilocycles $+\Delta$. The further side band of from 12 kilocycles $-\Delta$ to 60 kilocycles $-\Delta$ which is produced during the first conversion is not used. A second converter having a regulated carrier of 120 kilocycles $+\Delta$, whose value, as already explained, is derived by means of a regulating device from a comparison of an exact group pilot frequency of 84.08 kilocycles with the received pilot frequency of 84.08 kilocycles $+\Delta$, puts the side band again into the now exact basic group system of 60 kilocycles to 108 kilocycles. The further side band produced during the second conversion, between 248 kilocycles $+2\Delta$ and 300 kilocycles $+2\Delta$, is not used. In this way, the voice channels of the basic group will be available with the prescribed tolerance of 2 cycles per second. The same applies to the other groups of the entire carrier frequency band, considering the groups or supergroup conversions.

According to another feature of the present invention, one can, prior to establishing actual contact, i.e., before the transmitting channels of the earth stations are used to transmit voice messages, transmit only the group pilot frequency which, during this time, has a larger amplitude than during normal operation.

The regulation described above, which can remain in effect throughout the entire operation of the communication system, affords not only troublefree voice transmission, but can also be used for transmitting telegraph and teletypewriter symbols and data.

Figure 5:
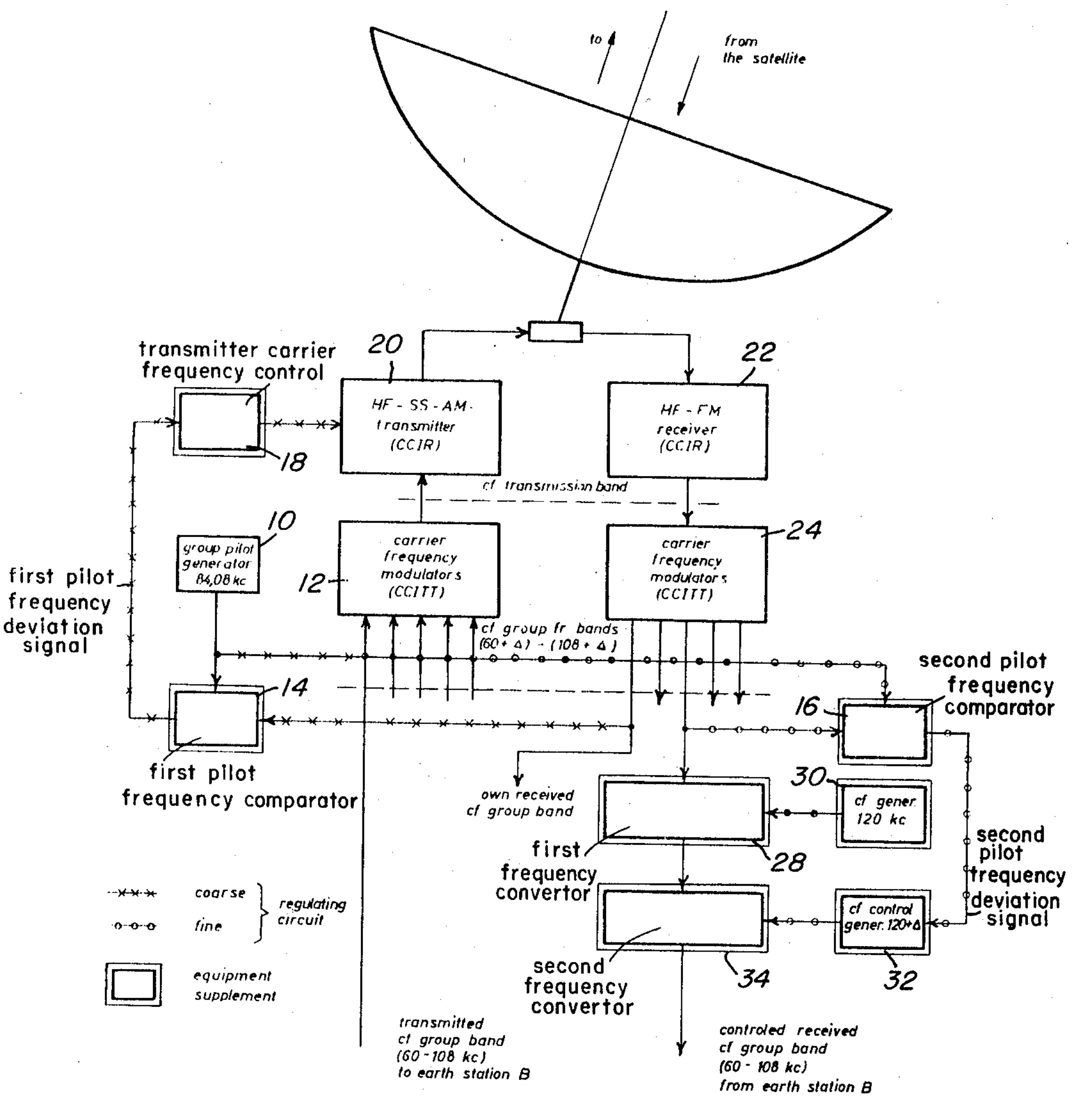
FIGURE 5 is a schematic block diagram which shows how the method can be carried out.

In this particular embodiment, the pilot frequency of 84.08 kc. is generated by a group pilot frequency generator 10, the output of which is applied to carrier frequency modulators 12, to a first pilot frequency comparator 14, and a second pilot frequency comparator 16. The pilot frequency signal is modulated on the transmitter carrier in carrier frequency modulators 12 and is transmitted via a high frequency single-side-band AM transmitter 20 to the satellite for retransmission to another ground station. The signals received via the satellite from another ground station contain the same 84.08 kc. pilot frequency signal, which is common to all earth stations in the communication network. The incoming signals are received and demodulated by a conventional satellite receiver system including a high frequency FM receiver 22 and a carrier frequency demodulator 24. The demodulated pilot frequency signal from demodulator 24 is applied to the first pilot frequency comparator 14 and also to the second pilot frequency comparator 16 to effect both a coarse and a fine regulation of frequency to compensate for frequency shifts. In the coarse regulation, the first pilot frequency comparator 14 compares the received pilot frequency signal to the output of pilot frequency generator 10 and produces a first pilot frequency deviation signal which is proportional to the difference of frequency thereinbetween. This pilot frequency deviation signal is applied to a transmitter carrier frequency control 18 to vary the carrier frequency of transmitter 20 so as to compensate for Doppler frequency shifts and other frequency shifts in the transmission link. The coarse frequency regulation, however, does not become effective until the next transmission from the earth station shown in FIGURE 5. In the meantime, the earth station of FIGURE 5 is still receiving signals which have been shifted off their normal frequency band in the transmission link. Accordingly, the fine frequency regulating system is provided to compensate for this frequency shift. In the fine frequency regulation, the second pilot frequency comparator 16 compares the received pilot frequency signal to the output of pilot frequency generator 10 and produces a second pilot frequency deviation signal which is proportional to the difference of frequency thereinbetween. This deviation signal is used to vary the frequency of the incoming signals to compensate for the frequency shift. In this particular embodiment of the invention, the received signals are varied in frequency by a two-stage frequency convertor in which the frequency of the incoming signals is first raised by 120 kc. in a first frequency convertor 28, which adds the received signals to the output of a 120 kc. carrier frequency generator 30. The pilot frequency deviation signal is then added to 120 kc. in a second carrier frequency control generator 32, and the output of carrier frequency control generator 32 is subtracted from the output of the first frequency convertor 28 in a second frequency convertor 34, whose output signal is then equal in frequency to the output frequency of the received signals minus the frequency shift indicated by the second pilot frequency deviation signal. This places the received signals in their correct frequency position.

On the next transmission from the earth station shown in FIGURE 5, the transmitter frequency thereof will have been corrected by the coarse regulating system to very nearly compensate for the frequency shift in the transmission link, and any remaining frequency shifts will be compensated for by the fine regulating system in the earth station which received that transmission. Accordingly, it will be clear that the combination of the coarse and fine regulating systems of this invention provides an extremely effective means for compensating for frequency shifts on both ends of the transmission link in both the transmitter and receiver circuits of all earth stations on the network.

It will be understood that the above description of the present invention is susceptible to various modifications, changes, and adaptations, and the same are intended to be comprehended within the meaning and range of equivalents of the appended claims.

FIGURE 5 is a schematic block diagram of the essential communication equipments of the earth station A. The earth station B is installed in the same way.

On the left side of the diagram the transmission equipment with the wiring of the coarse regulating circuit of the transmission frequency is shown, while on the right side of the receiving equipment is to be seen with the instruments, including both of the transfer frequency converters, for an exact attainment of the frequencies of the carrier frequency groups.

The high frequency transmitter-receiver set is installed in the usual way and has to be in accordance with the recommendations of the CCTR, likewise the carrier frequency equipments are installed in the normal way and have to match the recommendations of the CCITT.

In FIGURE 5, the components shown by the double frame symbols represent the components which will be provided to produce an actual, operating embodiment of the present invention.

What is claimed is:

1. In a satellite communication system wherein signals are transmitted from any one of a plurality of earth stations each having a transmitter and a receiver to a satellite station having a transmitter and a receiver, each earth station having assigned to it frequency channels which are combined into carrier frequency groups and transmitted together with a group pilot frequency as single-side-band amplitude modulation, the satellite station receiving the carrier frequency groups of all earth stations and, after conversion, retransmitting the same as a broadband signal, an earth station having an improved frequency regulating system comprising, in combination:

(a) a pilot frequency signal generator for generating a pilot frequency signal in said earth station;

(b) modulator means in the transmitter of said earth station for modulating said pilot frequency signal on the transmitter carrier signal thereof;

(c) demodulator means in the receiver of said earth station for demodulating incoming signals received by said earth station from a satellite station to recover said pilot frequency signal;

(d) frequency comparison means coupled to said pilot frequency generator and to said demodulator means for comparing the received pilot frequency signal to the output of said pilot frequency generator and for producing pilot frequency deviational signals proportional to the difference of frequency thereinbetween;

(e) transmitter carrier frequency control means coupled to said frequency comparison means and to the transmitter of said earth station for varying the transmitter carrier frequency thereof in response to said pilot frequency deviation signals to compensate for frequency shifts indicated thereby;

(f) frequency convertor means coupled to said frequency comparison means and to to receiver of said earth station for varying the frequency of received signals in response to said pilot frequency deviation signals to compensate for frequency shifts indicated thereby; and (g) said frequency comparison means comprising first and second pilot frequency comparators, the inputs of said first pilot frequency comparator being coupled to the output of said pilot frequency generator and said demodulator means, said first pilot frequency comparator being operable to produce a first pilot frequency deviation signal proportional to the difference of frequency between the received pilot frequency signal and the output of said pilot frequency generator, and the output of said first pilot frequency comparator being coupled to said transmitter carrier frequency control to vary the frequency of said transmitter in accordance with said first pilot frequency deviation signal to compensate for phase shifts indicated thereby, the inputs of said second pilot frequency comparator being coupled to said pilot frequency signal generator and to said demodulator means, said second pilot frequency signal comparator being operable to produce a second pilot frequency deviation signal proportional to the difference of frequency between the received pilot frequency signal and the output of said pilot frequency signal generator, and the output of said second pilot frequency comparator being coupled to said frequency convertor means for varying the received signals in accordance with said second pilot frequency deviation signal to compensate for frequency shifts indicated thereby.

2. The improvement defined in claim 1 wherein said frequency convertor means comprises a first frequency convertor coupled to the receiver of said earth station for adding a fixed frequency to the received signals, means coupled to the output of said pilot frequency comparison means for adding the same fixed frequency to said pilot frequency deviation signal, and a second frequency convertor coupled to said last-mentioned means and to said first frequency convertor for subtracting the sum of said fixed frequency plus said pilot frequency deviation signal from the output of said first frequency convertor to produce output signals whose frequency is compensated for frequency shifts indicated by said deviation signal.

3. The improvement defined in claim 1 wherein the frequency range of said carrier frequency group is 60 to 108 kc. and wherein the frequency of said pilot frequency signal is 84.08 kc.

4. The improvement defined in claim 1 wherein said satellite comprises a subsynchronously orbiting satellite.

5. The improvement defined in claim 4 wherein the broad-band signal transmitted by said satellite is frequency modulated.

6. The improvement defined in claim 1 comprising two ground stations as defined therein, the pilot frequency transmitted by the first earth station, which is received by the second earth station in the broad-band signal of the satellite station, is compared to the pilot frequency signal of the second station for deriving said pilot frequency deviation signal by means of which the frequency of the second stations' receiver band is varied to compensate for frequency shifts in the transmission path between the first and second earth stations.

7. The improvement defined in claim 6 and further comprising means for effecting two carrier frequency conversions at the second station for shifting the receiver band frequency into its exact frequency position.

References Cited

UNITED STATES PATENTS

| | | | |
|---|---|---|---|
| 1,844,973 | 2/1932 | Ports | 325—49 |
| 2,568,568 | 9/1951 | Stansbury | 325—18 X |
| 2,775,647 | 12/1956 | Ensink | 179—15 |
| 3,028,488 | 4/1962 | Hudspeth et al. | 325—7 |
| 3,201,692 | 7/1965 | Sichak et al. | 325—17 |

OTHER REFERENCES

"Transoceanic Communication By Means of Satellites," J. Pierce and R. Kompfner, in Proceedings of the IRE, March 1959, pp. 372–380.

JOHN W. CALDWELL, *Primary Examiner.*

DAVID G. REDINBAUGH, *Examiner.*

B. V. SAFOUREK, *Assistant Examiner.*